W. W. BILLINGS.
SELF WINDING SPRING MOTOR.
APPLICATION FILED MAY 26, 1917. RENEWED FEB. 7, 1919.
1,315,459.
Patented Sept. 9, 1919.
3 SHEETS—SHEET 1.
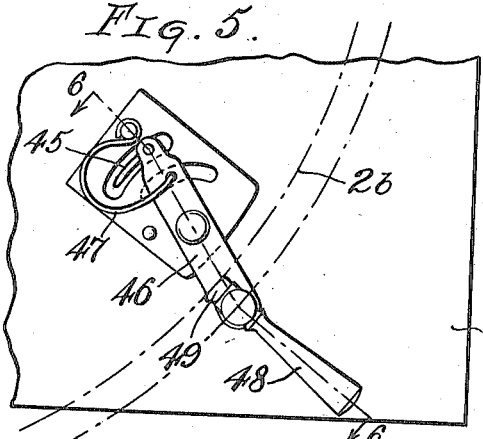
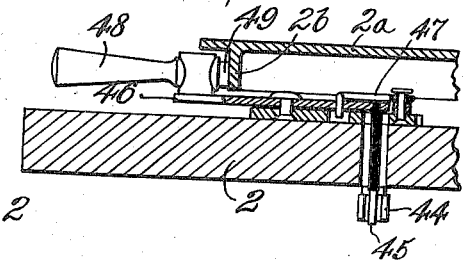
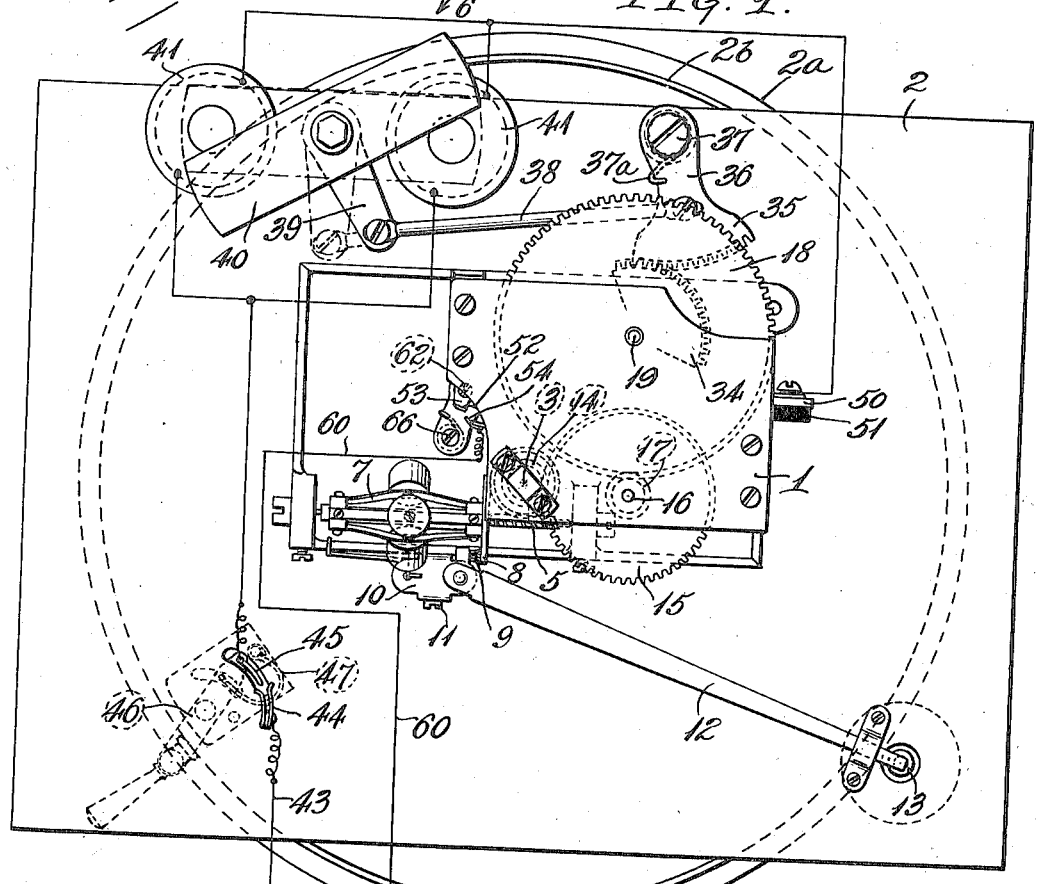
Inventor.
William W. Billings
By Brockett and Hyde
Attys.

W. W. BILLINGS.
SELF WINDING SPRING MOTOR.
APPLICATION FILED MAY 26, 1917. RENEWED FEB. 7, 1919.

1,315,459.

Patented Sept. 9, 1919.
3 SHEETS—SHEET 2.

Inventor.
William W. Billings
By Brockett and Hyde
Atty's.

W. W. BILLINGS.
SELF WINDING SPRING MOTOR.
APPLICATION FILED MAY 26, 1917. RENEWED FEB. 7, 1919.

1,315,459.

Patented Sept. 9, 1919.
3 SHEETS—SHEET 3.

Inventor.
William W. Billings
By Crockett and Hyde
Attys.

UNITED STATES PATENT OFFICE.

WILLIAM W. BILLINGS, OF CLEVELAND, OHIO.

SELF-WINDING SPRING-MOTOR.

1,315,459.  Specification of Letters Patent.  Patented Sept. 9, 1919.

Application filed May 26, 1917, Serial No. 171,142. Renewed February 7, 1919. Serial No. 275,674.

*To all whom it may concern:*

Be it known that I, WILLIAM W. BILLINGS, citizen of the United States, residing at Cleveland, in the county of Cuyahoga and State of Ohio, have invented certain new and useful Improvements in Self-Winding Spring-Motors, of which the following is a specification.

This invention relates to spring motors and more particularly to what are known as self winding motors. The object of the invention is to provide an improved spring motor embodying means operated automatically at suitable intervals to wind the main spring, whereby to maintain a practically constant tension of said spring and reducing to a minimum any variation in its power. A further object of the invention is to provide a spring motor whose power is supplied by electrically operated devices capable of operation by any suitable source of current, and which motor may be used for driving an operating shaft adapted for connection to any mechanism or device to be driven, and to generally simplify and improve the contact and other mechanism of the electrical devices and not only reduce the cost for construction and maintenance but also secure greater accuracy in the resulting movement.

Further objects of the invention are in part obvious and in part will appear more in detail hereinafter.

The invention comprises the spring motor hereinafter described and claimed.

Figure 2:
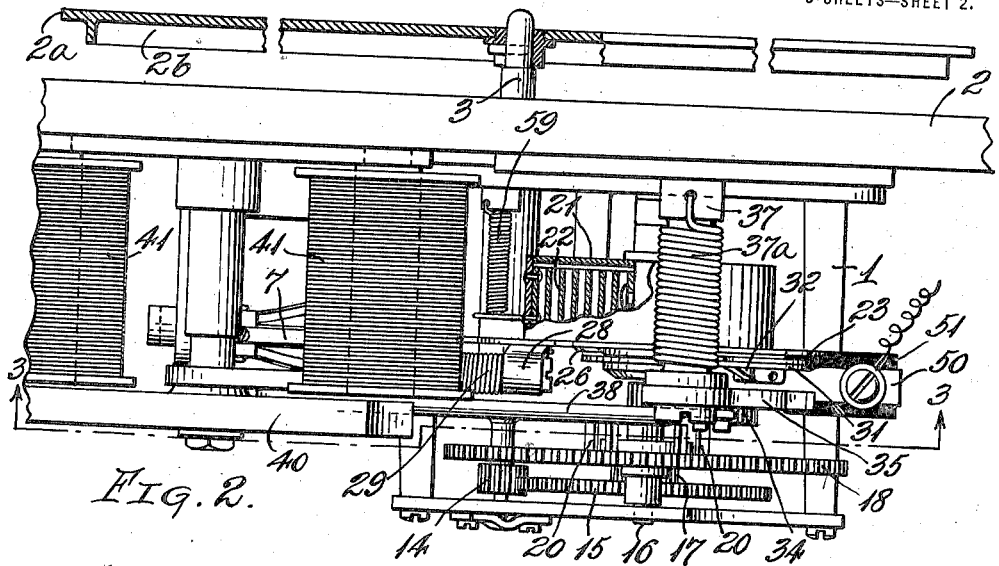
Figure 3:
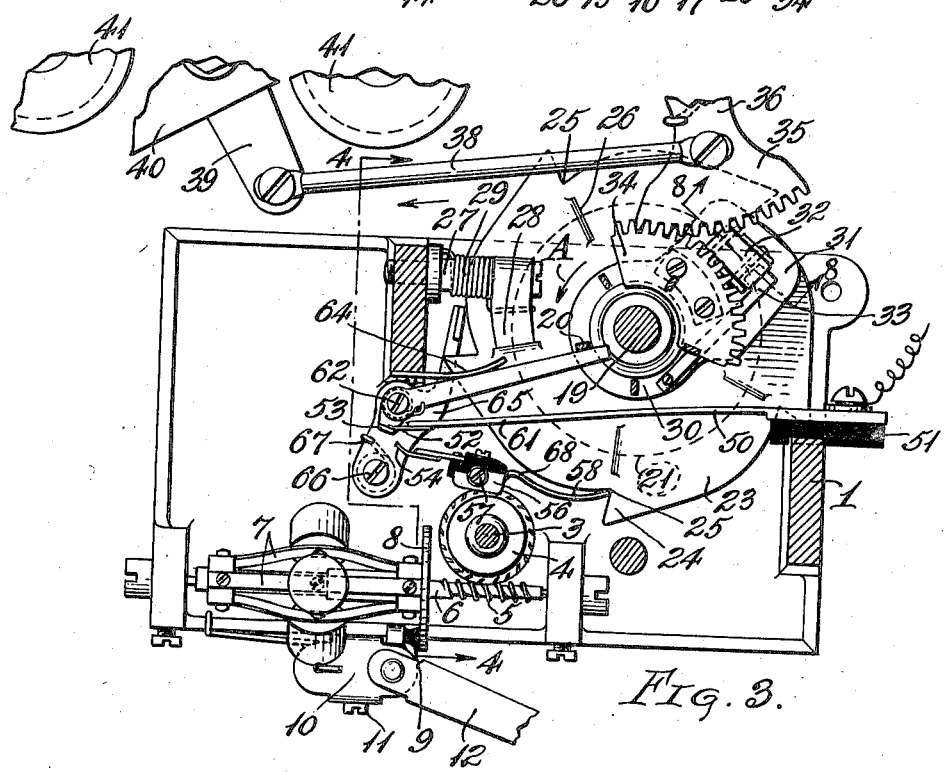
Figure 7:
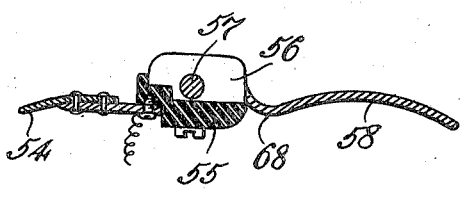
Figure 8:
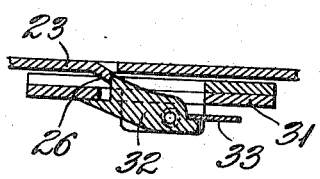
Figure 4:
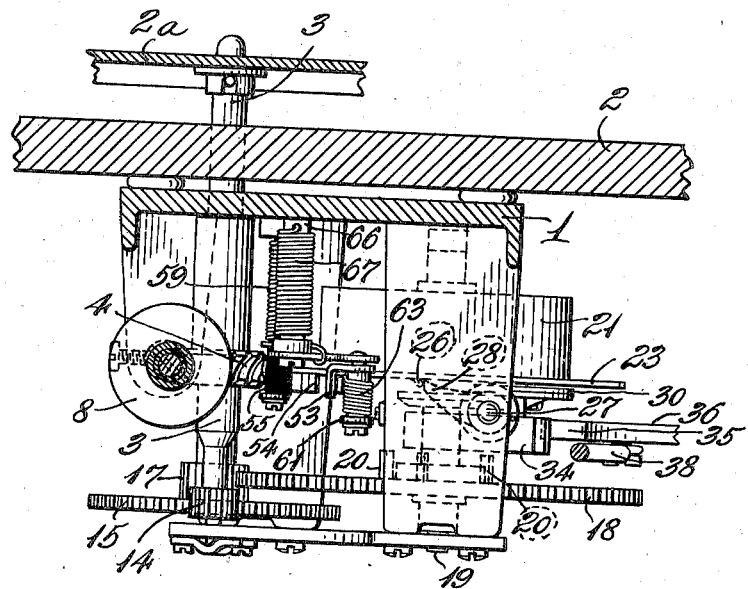

In the drawings, which represent one embodiment of the invention, Figure 1 is a bottom plan view; Fig. 2 is a side elevation, the view being taken from the top Fig. 1; Fig. 3 is a sectional plan view substantially on the line 3—3, Fig. 2; Fig. 4 is a detail sectional elevation on the line 4—4, Fig. 3; Fig. 5 is a plan view, on a larger scale, of the controlling brake lever; Fig. 6 is a sectional view thereof on the line 6—6, Fig. 5; Fig. 7 is a detail sectional view of the contact carrying arm; and Fig. 8 is a detailed sectional view, on the line 8—8, Fig. 3, of a ratchet pawl.

In the drawing the spring motor has been shown as organized and arranged for operating a phonograph or talking machine, or in other words for turning the shaft to which the record table is attached. It is to be understood, however, that the drawings are only illustrative and are not to be taken as restricting the invention to such use as the motor is adapted for driving or operating any mechanism or device, such as a clock, toy or the like, and either intermittently or continuously, as desired.

The mechanism shown in the drawings comprises a suitable frame 1 carried by and depending from the horizontal wall 2 of the motor cabinet or casing. In said frame is journaled the operating shaft 3, which in the particular machine shown is the shaft which projects through and extends above the wall 2 and on its upper end supports the record carrying table $2^a$ having a flange $2^b$. This shaft, however, could be connected to drive or operate any mechanism. Shaft 3 is suitably connected through gearing or otherwise to a speed controlling device, either an ordinary escapement when intermittent movement of the operating shaft is desired, as in a clock, or a suitable governor when motion at uniform speed is desired. The drawings show the latter form, shaft 3 carrying a spiral gear 4 driving a screw 5 on a shaft 6 carrying the weighted spring governor arms 7 attached to a sliding disk 8. The motion of the shaft 6 rotates the weights and disk and presses said disk with increasing frictional effect against a pressure foot 9 which may be adjustable to vary the operating speed of the mechanism. Said foot is shown as carried by a member 10 oscillated on a pin 11 by an arm 12 operable in the usual manner by a screw or other adjustable member 13 passing through wall 2. The particular construction of this adjusting device is not essential.

Shaft 3 carries a small gear 14 meshing with a large gear 15 on a shaft 16 having a small gear 17 driven by a large gear 18, on a main driving shaft 19. Gear 18, on its upper face, carries a series of circumferentially spaced pins 20 for a purpose to be described.

On shaft 19 is journaled a hollow drum 21 containing the coiled operating main spring 22, one end of which is fastened to said drum and the other to the shaft. Said drum also carries a combined cam and ratchet plate 23 having peripheral teeth 24 and notches 25 and on its face a series of raised ratchet projections 26. One of the frame parts carries a pin 27 on which is a pivoted pawl 28 held by a spring 29 against the face of said plate. This pawl coöperates with the projections 26 to prevent backward rotative movement of the drum and thereby retains in the spring 22 any power stored therein by winding the drum forwardly.

Shaft 19 also serves as a support for a disk or plate 30, lying adjacent the plate 23 and rotatable loosely on said shaft. Said disk 30 carries an arm 31 on which is a pivoted pawl 32 whose tooth projects through the arm and is held against the plate 23 by a leaf spring 33. This pawl also coöperates with the projections 26 and by turning the disk 30 on the shaft in the forward direction said tooth advances the drum and winds the main spring. The disk carries a gear segment 34 which meshes with a gear segment 35 on an arm 36 pivoted on a post 37, said arm being connected by a link 38 with an arm 39 connected to a pivoted armature 40 which coöperates with two electro-magnets 41. The disk 30, gear segments 34, 35 and armature are normally held in the position shown in Fig. 3 by a spiral spring 37$^a$ connecting arm 36 to its post 37. In this position armature 40 is inclined away from the cores of the two electro-magnets. When said magnets are energized the armature is attracted thereby to a position directly opposite the electro-magnets, as in dotted lines, Fig. 1, its movement advancing the drum and winding the main spring. The pull of the magnets cannot move the armature beyond this position, and as it strikes no fixed stop the usual necessity for a dash pot is avoided and overwind is nevertheless prevented.

The magnet coils are in a circuit connected to a suitable source of current, either alternating or direct, such as a battery or generator. The continuity of the circuit is controlled by the mechanism itself so that the magnets are periodically energized at regular intervals to wind the spring step by step and restore to it the power taken off from the shaft 3. The device for effecting this result will now be described.

42 indicates the source of current, a wire 43 from which leads to one contact 44 of a switch having a coöperating contact 45. Contact 44 is stationary, while contact 45 is carried by a swinging arm 46 held by a spring 47 in either of two positions and provided with an operating handle 48 and a pressure or brake foot 49. In the braking position of said arm the foot 49 presses against the table flange 2$^b$ and prevents the mechanism from rotating, while the switch 44, 45 is open. In the other position of said arm the table is released and the switch 44, 45 is closed.

From the contact 45 the wire 43 leads to and through the magnet coils and thence to one end of a spring arm 50 mounted upon an insulating block 51 on the frame. This arm carries a contact 52 at its other end coöperating with an automatically actuated latch 53 and also with a contact 54 mounted upon an insulated block 55 carried by a member 56 pivoted upon a post 57. Said member has a tail 58 held against the toothed periphery or cam edge of the plate 23 by a spring 59. A wire 60 electrically connects the contact 54 with the other side of the source of current and completes the circuit thereto.

Latch 53 has swinging motion about two centers. It is directly connected to a long arm 61 pivoted upon a post 62 and whose far end is held by a spring 63 against one of the advancing pins 20, which will be understood to move in the direction of arrow A, Fig. 3. When said pins in turn pass and release the arm it turns in a counterclockwise direction, Fig. 3, until it strikes a spring stop 64 on the frame. Post 62 is carried by an arm 65 pivoted upon a frame post 66, a spring 67 tending to rotate said arm in a clockwise direction, Fig. 3, and hold the tail end of said arm in contact with the toothed periphery or cam edge of plate 23.

The mechanism described operates as follows: Let us assume that the parts are in the position shown in Fig. 3, with the contacts 52, 54, separated, contact 52 being held back by the latch 53; that the main spring is wound up to the proper tension to turn the mechanism; that the brake shoe 9 is adjusted to such frictional contact with the disk 8 as to allow the mechanism to rotate at the desired speed; and that the swinging arm 46 is adjusted to braking position with the brake foot 49 pressed against the flange of the table, with the switch 44, 45 opened. In this position of the parts the electrical circuit through the magnets is broken at two places, to-wit, at both the hand and automatic switches. The power of the main spring is retained by the pawl 28, which prevents backward rotation of the main spring carrying drum.

To produce rotation of the table the swinging arm 46 is turned to its brake release position, which releases the brake shoe from the flange of the table and allows said table to turn, and which also closes the hand switch 44, 45. The flow of current to the magnet coils is hence interrupted only at the automatic switch. The main spring turns shaft 19 and through the gears 18, 17, 15 and 14 rotates the operating shaft 3. Rotation of gear 18 causes the pins 20 to move in the direction of arrow A, Fig. 3. One of said pins engages the long arm 61, the motion of said pin gradually turning said arm about the post 62 as a pivot until the latch 53 is finally released from the contact 52, whereupon the spring arm 50, which has been flexed, moves contact 52 into engagement with the coöperating contact 54, thereby closing the automatic switch and completing a circuit from the source of current through the coils of the electro-magnets. The energization of said electro-magnets attracts their coöperating armature, turning it to the dotted line position, Fig. 1, which, through the link 38 and gear segments 34, 35, rotates the disk 30, whose pawl 32 engages one of the projections 26 of the plate 23 and turns the spring drum. The rotation of said drum winds the main spring, it being understood that at each operation of the electro-magnets the drum is advanced one step, and that the operation of said magnets occurs at intervals repeated sufficiently often to maintain the main spring at substantially uniform operating tension.

The turning motion of the armature is sufficient to advance the drum a little more than one complete step, or until one of the projections 26 passes beyond the holding pawl 28. At the instant when the latch 53 has been moved back and has released contact 52 the pin 20 has not passed beyond or released the arm 61. As the drum is wound up the peripheral cam edge of the plate 23 moves past the tail of arm 65 and turns said arm in a counter-clockwise direction Fig. 3. This motion is sufficient to fully withdraw the arm 61 from engagement with the pin 20, so that said arm 61 has a slight movement in a counter-clockwise direction until it engages the fixed stop 64. This motion of arm 61, however, is not sufficient to allow the latch 53 to move in beyond the path of contact 52. Another tooth portion of the cam edge of plate 23, during the rotation of said plate, engages the rounded portion 68 of the tail 58, and produces a quick movement of member 56 in a clockwise direction, Fig. 3, which motion causes the contact 54 to push the contact 52 back to its original position. After said contact 52 reaches its original position the tail of arm 65 drops off from the end of the cam tooth which is moving past said arm, so that the latch 53 drops in behind the contact 52. The latter contact projects slightly beyond its coöperating contact 54, so that in this position the latch 53 will hold or retain contact 52, but will not interfere with contact 54. The final motion of the plate 23, just as it reaches its new position, causes the tail 58 of member 56 to drop off from its cam tooth to the position shown in Fig. 3, thereby opening the automatic switch and restoring contact 54 to its original position.

As soon as the automatic switch is opened, as described, the magnets are deënergized and the spring 37ª returns armature, link 38, gear segments 34, 35, and pawl 32 to the position shown in Fig. 3. All of the mechanism is then in its original position ready for the next operation.

Briefly stated the mechanism consists, therefore, in a main spring arranged to apply its power for operating a mechanism, together with electrically actuated means adapted when operated to wind said spring, combined with some means actuated by the mechanism itself for first closing the circuit to actuate said electrical mechanism, and then open said circuit after the electrical means has operated. This arrangement requires practically no current at all for its operation, as the circuit is closed only at relatively infrequent intervals and then only instantaneously, being immediately opened. Moreover, it is impossible for the mechanism to come to rest in any position in which current can be dissipated or lost. Two safe-guards are provided to prevent this. One is the hand operated switch which opens the circuit each time the brake is applied for stopping the mechanism. In the phonograph shown, for example, whenever the table is stopped the circuit is broken at the hand switch regardless of the conditions at the automatic switch. However, even the automatic switch could never remain in closed position. Even if the table is stopped at the very instant when the automatic switch is closed, the closing of said automatic switch energizes the electro-magnets, actuates the winding mechanism to wind up the spring another step, and finally produces opening movement of the automatic switch, in which condition the mechanism will remain until it is allowed to again operate by release of the brake.

A phonograph or other similar device equipped with this mechanism requires absolutely no attention by the operator except to adjust the rate of rotation through the governor device. If the lead wires are connected to a source of current the spring is always wound up in operating condition and is ready to start the mechanism whenever the brake is released. It never needs to be wound and when the mechanism is stopped is ready for another operation at any time.

What I claim is:—

1. The combination with an operating shaft, of a spring for actuating the same, an electro-magnet adapted when energized to wind said spring, a rotary member actuated thereby, contacts controlling a circuit through said magnet, a latch for controlling said contacts, and means operatively connected with said shaft and rotary member for operating said latch.

2. The combination with an operating shaft, of a spring for actuating the same, an electro-magnet adapted when energized to wind said spring, a rotary member actuated thereby, contacts controlling a circuit through said magnet, a latch for controlling said contacts, means operatively connected with said shaft and rotary member for operating said latch, and an operative connection between said member and one contact.

3. The combination with an operating shaft, of a spring for actuating the same, an electro-magnet, a pawl operated thereby, a ratchet member operated by said pawl and adapted to wind said spring, means operated by said shaft for closing a circuit through said magnet, and means operated by said ratchet member for opening said circuit.

4. The combination with an operating shaft, of a spring for actuating the same, an electro-magnet, means adapted to wind said spring when said magnet is energized, two coöperating contacts in circuit with said magnet, means normally holding said contacts apart and operated by said shaft to release one contact and allow it to close the circuit, and means operated by said magnet for opening the circuit.

5. The combination with an operating shaft, of a spring for actuating the same, an electro-magnet, a movable pawl actuated thereby, a ratchet plate actuated by said pawl and arranged when rotated to wind said spring, relatively movable contacts in a circuit to said magnet, means operated by said shaft and controlling one of said contacts for closing said circuit, and means operated by said ratchet plate and controlling the other contact for opening said circuit.

In testimony whereof I affix my signature.

WILLIAM W. BILLINGS.